US012608860B2

(12) United States Patent　　　(10) Patent No.:　US 12,608,860 B2
Qian　　　　　　　　　　　　　(45) Date of Patent:　Apr. 21, 2026

(54) METHOD FOR IMAGE GENERATION, ELECTRONIC DEVICE AND NON-TRANSITORY STORAGE MEDIUM

(71) Applicant: ALIBABA INNOVATION PRIVATE LIMITED, Singapore (SG)

(72) Inventor: Qi Qian, Bellevue, WA (US)

(73) Assignee: ALIBABA INNOVATION PRIVATE LIMITED, Singapore (SG)

( * ) Notice: Subject to any disclaimer, the term of this patent is extended or adjusted under 35 U.S.C. 154(b) by 122 days.

(21) Appl. No.: 18/746,688

(22) Filed: Jun. 18, 2024

(65) Prior Publication Data

US 2025/0384603 A1　　Dec. 18, 2025

(51) Int. Cl.
G06T 11/60　　　(2026.01)
G06T 5/70　　　(2024.01)

(52) U.S. Cl.
CPC ............... G06T 11/60 (2013.01); G06T 5/70 (2024.01)

(58) Field of Classification Search
CPC ................................. G06T 11/60; G06T 5/70
See application file for complete search history.

(56) References Cited

U.S. PATENT DOCUMENTS

| | | | | |
|---|---|---|---|---|
| 2024/0037822 A1* | 2/2024 | Aberman | ............... | G06N 3/096 |
| 2025/0131277 A1* | 4/2025 | Garrepalli | ............. | G06N 3/096 |
| 2025/0245883 A1* | 7/2025 | Showalter | ................. | G06T 5/70 |

FOREIGN PATENT DOCUMENTS

| | | | | | |
|---|---|---|---|---|---|
| CN | 118035484 A | * | 5/2024 | ............. | G06V 40/20 |
| WO | WO-2016204462 A1 | * | 12/2016 | ........... | H04N 19/107 |

* cited by examiner

*Primary Examiner* — Daniel F Hajnik
*Assistant Examiner* — Joshua Jungwook Suo
(74) *Attorney, Agent, or Firm* — The Sun IP Law

(57) ABSTRACT

The present disclosure provides a method for image generation, an electronic device and a non-transitory storage medium. The method includes the following steps: a source image, a source prompt, a target prompt, a first weight and a second weight are obtained, the source prompt is used for providing a source text condition corresponding to the source image, the target prompt is used for providing a target text condition to obtain a target image, the first weight is a weight of a guidance scale shared for inversion and generation in a source branch, the second weight is a weight of a guidance scale kept for generation in a target branch; inversion for image editing is performed to generate the target image based on the source image, the source prompt, the target prompt, the first weight and the second weight.

14 Claims, 4 Drawing Sheets

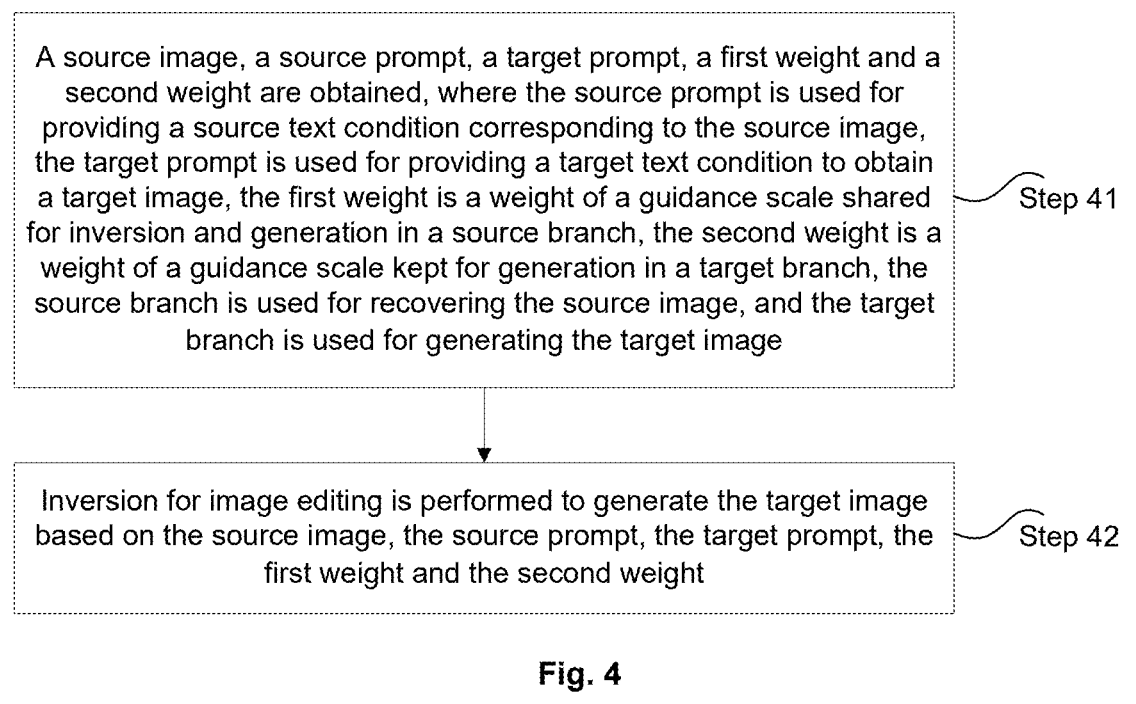

A source image, a source prompt, a target prompt, a first weight and a second weight are obtained, where the source prompt is used for providing a source text condition corresponding to the source image, the target prompt is used for providing a target text condition to obtain a target image, the first weight is a weight of a guidance scale shared for inversion and generation in a source branch, the second weight is a weight of a guidance scale kept for generation in a target branch, the source branch is used for recovering the source image, and the target branch is used for generating the target image Step 41

Inversion for image editing is performed to generate the target image based on the source image, the source prompt, the target prompt, the first weight and the second weight Step 42

Fig. 4

METHOD FOR IMAGE GENERATION, ELECTRONIC DEVICE AND NON-TRANSITORY STORAGE MEDIUM

TECHNICAL FIELD

The present disclosure relates to the technical field of image processing, and in particular to a method for image generation, an electronic device and a non-transitory storage medium.

BACKGROUND

Diffusion models have demonstrated the impressive performance of image generation with text guidance. Inspired by the learning process of diffusion, existing images can be further edited according to text by Denoising Diffusion Implicit Models (DDIM) inversion. However, the vanilla DDIM inversion is not optimized for classifier-free guidance and the accumulated error results in the undesired performance.

SUMMARY

At least some embodiments of the present disclosure provide a method for image generation, an electronic device and a non-transitory storage medium.

In some embodiments of the present disclosure, a method for image generation is provided, and the method includes the following steps: a source image, a source prompt, a target prompt, a first weight and a second weight are obtained, the source prompt is used for providing a source text condition corresponding to the source image, the target prompt is used for providing a target text condition to obtain a target image, the first weight is a weight of a guidance scale shared for inversion and generation in a source branch, the second weight is a weight of a guidance scale kept for generation in a target branch, the source branch is used for recovering the source image, and the target branch is used for generating the target image; inversion for image editing is performed to generate the target image based on the source image, the source prompt, the target prompt, the first weight and the second weight.

In another embodiment of the present disclosure, an electronic device is further provided, and the electronic device includes at least one processor, a memory communicatively connected with the at least one processor, the memory is arranged to store instructions executable by the at least one processor, the instructions, when executed by the at least one processor, enabling the at least one processor to execute the following steps: a source image, a source prompt, a target prompt, a first weight and a second weight are obtained, the source prompt is used for providing a source text condition corresponding to the source image, the target prompt is used for providing a target text condition to obtain a target image, the first weight is a weight of a guidance scale shared for inversion and generation in a source branch, the second weight is a weight of a guidance scale kept for generation in a target branch, the source branch is used for recovering the source image, and the target branch is used for generating the target image; inversion for image editing is performed to generate the target image based on the source image, the source prompt, the target prompt, the first weight and the second weight.

In another embodiment of the present disclosure, a non-transitory storage medium is further provided, and the non-transitory storage medium includes: an executable program, and when the executable program runs, an electronic device on which the non-transitory storage medium is located to execute the following steps: a source image, a source prompt, a target prompt, a first weight and a second weight are obtained, the source prompt is used for providing a source text condition corresponding to the source image, the target prompt is used for providing a target text condition to obtain a target image, the first weight is a weight of a guidance scale shared for inversion and generation in a source branch, the second weight is a weight of a guidance scale kept for generation in a target branch, the source branch is used for recovering the source image, and the target branch is used for generating the target image; inversion for image editing is performed to generate the target image based on the source image, the source prompt, the target prompt, the first weight and the second weight.

It should be appreciated that the content is described in this section is not intended to identify key or critical features of embodiments of the disclosure, nor to limit the scope of the disclosure. Other features of the present disclosure will become readily apparent from the following description.

BRIEF DESCRIPTION OF THE DRAWINGS

The accompanying drawings are used for better understanding the present solution, and do not constitute limitations to the present disclosure. In the drawings:

FIG. 4 is a flowchart of an image generation method according to some embodiments of the present disclosure

DETAILED DESCRIPTION

Figure 1:
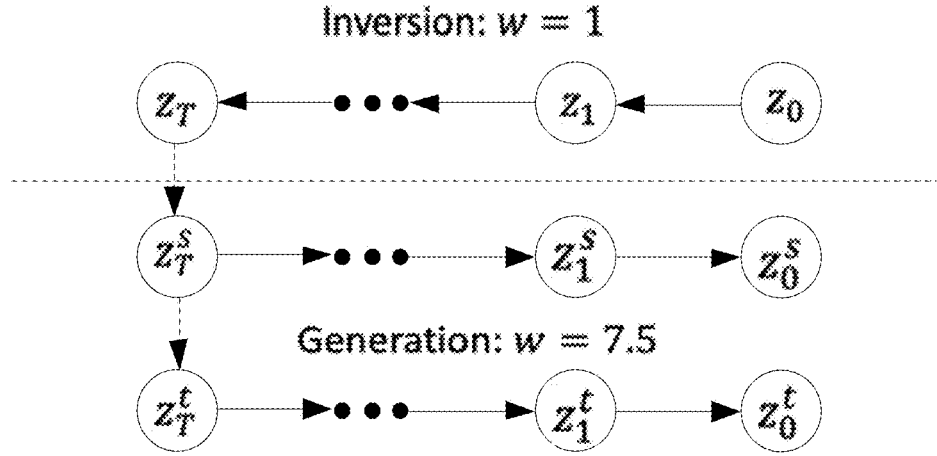
FIG. 1 is a schematic diagram of the procedure of DDIM inversion for image editing known to the inventors.

In order to enable those skilled in the art to better understand the present disclosure, the technical solution in the present embodiment will be described clearly and completely with reference to the accompanying drawings in the present embodiment. It is evident that the described embodiments are a part of the embodiments of the present disclosure, not all of them. Based on the embodiments in this disclosure, all other embodiments obtained by ordinary technicians in the field without creative work should fall within the scope of protection of the present disclosure.

It should be noted that the terms "first", "second", etc., in the specification and claims of this disclosure and the above drawings are used to distinguish similar objects and are not intended to describe a specific order or sequence. It should be understood that such data used in this way can be interchanged in appropriate circumstances so that the embodiments of the present disclosure described here can be implemented in an order other than those illustrated or described here. In addition, the terms "include" and "have" and their variations are intended to cover non-exclusive inclusion, for example, a process, method, system, product, or device that includes a series of steps or components is not limited to those steps or components clearly listed but may include other steps or components that are not clearly listed or are inherent to these processes, methods, products, or devices.

Firstly, some of the nouns or terms that appear in the description of the present embodiment are subject to the following interpretations:

Diffusion refers to a method for generating images from random noise.

DDIM (Denoising Diffusion Implicit Models) Inversion refers to a method for obtaining the corresponding noise from a given image.

Denoising Network refers to a model for predicting the noise which needs to be removed to generate the corresponding image.

Classifier-Free Guidance refers to a strategy for applying a denoising network under both text-conditions and null-text conditions, assisting in generation based on a given text.

Diffusion models witness the tremendous success of image generation. To obtain a synthetic image, some methods known to the inventors first sample a random noise from the Gaussian distribution and then a learned denoising network will refine the sample iteratively to recover a high quality image from the noise. Moreover, text information may be included as conditions for denoising to enable text-guided image generation. Due to the impressive performance of image generation, text-guided image editing has attracted much attention recently. Unlike the text-guided generation task that with the target text condition, image editing aims to obtain a target image from a source image with the target condition. Intuitively, image editing may reuse the procedure of generation. However, the knowledge from the source image, e.g., structure, background, etc. should be kept in the target image when editing. Considering that the image is generated from the random noise in diffusion, the noise corresponding to the source image may be applied to obtain the target image for knowledge preservation. However, Denoising Diffusion Probabilistic Models (DDPM) sampling in diffusion is a stochastic process and the DDPM sampling is hard to obtain the original noise that generates the source image. To tackle the challenge, a deterministic DDIM sampling is developed to reserve the generation process. It shares the same training objective as DDPM and can infer the initial noise for images with the model pre-trained by DDPM. With the source noise obtained by DDIM inversion, many image editing methods are developed to leverage the generation process in diffusion. Among different methods, some inversion-based solutions have a dual branch framework to preserve the information from the source branch and edit the image in the target branch. Therefore, different methods are developed for the source branch and target branch, respectively. Concretely, with the given the initial noise from the source image, the framework consists of denoising processes for the source image and target image, respectively. At each step, the latent state of different branches will be updated with the corresponding conditions and the information from the source branch is incorporated into the target branch to preserve the content from the source image.

FIG. 1 is a schematic diagram of the procedure of DDIM inversion for image editing known to the inventors. As shown in FIG. 1, the source branch will share the large guidance scale from the target branch, which introduces the additional approximation error for recovering the source image and results in the degenerated performance. With the classifier-free guidance, the denoising network depends on a text condition and a null-text condition. Therefore, the embedding of null text is proposed to be optimized to reduce the error from the asymmetric guidance scale. However, the embedding has to be optimized by learning, which is time-consuming. Furthermore, the learning process of null text embeddings may be improved by setting the learning process of null text embeddings as the text condition from the source image, which implies a guidance scale of 1 for the source branch. According to the architecture of the dual branch framework, research efforts may be categorized into two aspects: latent state optimization in the source branch and knowledge transfer to the target branch. First, due to the approximation error in each step of DDIM inversion, the accumulated error will mislead the obtained random noise, which makes the obtained random noise hard to recover the exact source image from the source branch. Many algorithms have been developed to mitigate the challenge. Concretely, the embeddings of null text in classifier-free guidance were optimized to minimize the gap between latent states from inversion and generation while the latent states are directly projected in the generation process back to those in the inversion process to reduce the approximation error. Second, appropriate knowledge from the source branch was transferred to the target branch for editing. For the target branch, the cross-attention map fused from the source branch may introduce the desired knowledge to the target branch.

In the present disclosure, the inventors investigate the approximation error in DDIM inversion and propose to disentangle the guidance scale for the source and target branches to reduce the approximation error while keeping the original framework. Moreover, a better guidance scale than default settings is derived.

In the present disclosure, the inventors revisit the vanilla DDIM inversion for the source branch. First, the inventors find that the approximation error in the source branch is mainly from the asymmetric guidance scale from the classifier-free guidance, where the inversion process has the guidance scale as 1 while the generation process holds a much larger scale to focus on the text condition as shown in FIG. 1. To mitigate the issue from the asymmetric guidance scale, the inventors propose to keep the same guidance scale for inversion and generation in the source branch. The symmetric guidance scale helps reduce the approximation error in the latent states for the source image. Moreover, the inventors investigate the selection of the symmetric guidance scale and the theoretical analysis shows that the approximation error is further reduced by selecting an appropriate guidance scale beyond the default settings, i.e., 0.5. By adopting the symmetric guidance scale for the source branch while keeping the target branch unchanged, simple framework of the inventors improves the performance of vanilla DDIM inversion significantly.

Figure 2:
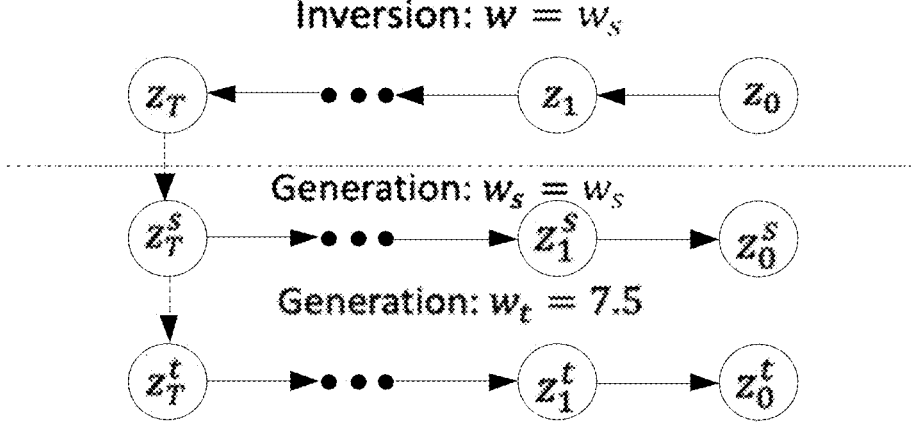
FIG. 2 is a schematic diagram of the procedure of DDIM inversion for image editing according to some embodiments of the present disclosure.

FIG. 2 is a schematic diagram of the procedure of DDIM inversion for image editing according to some embodiments of the present disclosure. As shown in FIG. 2, compared with DDIM inversion, the original null text embedding is kept but the guidance scale is changed for the source branch directly. Moreover, 1 is not the optimal solution for minimizing the approximation error and the performance is facilitated with an appropriate guidance scale. Finally, the method provided in the present disclosure changes the weight of the guidance scale without introducing any additional operations. In other words, the method keeps the simple framework of the DDIM inversion and shows that the approximation error is minimized by obtaining an appropriate guidance scale for the source branch.

The beneficial technical effects of the embodiments described in the present disclosure may be summarized as follows.

First, to improve the generation fidelity of the source image, the method proposes to have a symmetric guidance scale for the source branch while keeping the large guidance scale for the target branch. The method changes one parameter in DDIM inversion without sacrificing the simplicity of the framework.

Second, the method analyzes the selection of the guidance scale from the perspective of minimizing the approximation error.

Third, examples with different editing types confirm that the method can improve the DDIM inversion for image editing under the same framework.

According to some embodiments, a method implementation example of an image generation method is provided. It should be noted that the steps shown in the flowchart of the accompanying drawings can be executed in a computer system, such as a set of computer-executable instructions. Although a logical sequence is shown in the flowchart, in some cases, the steps shown or described here can be performed in an order different from that presented.

Figure 3:
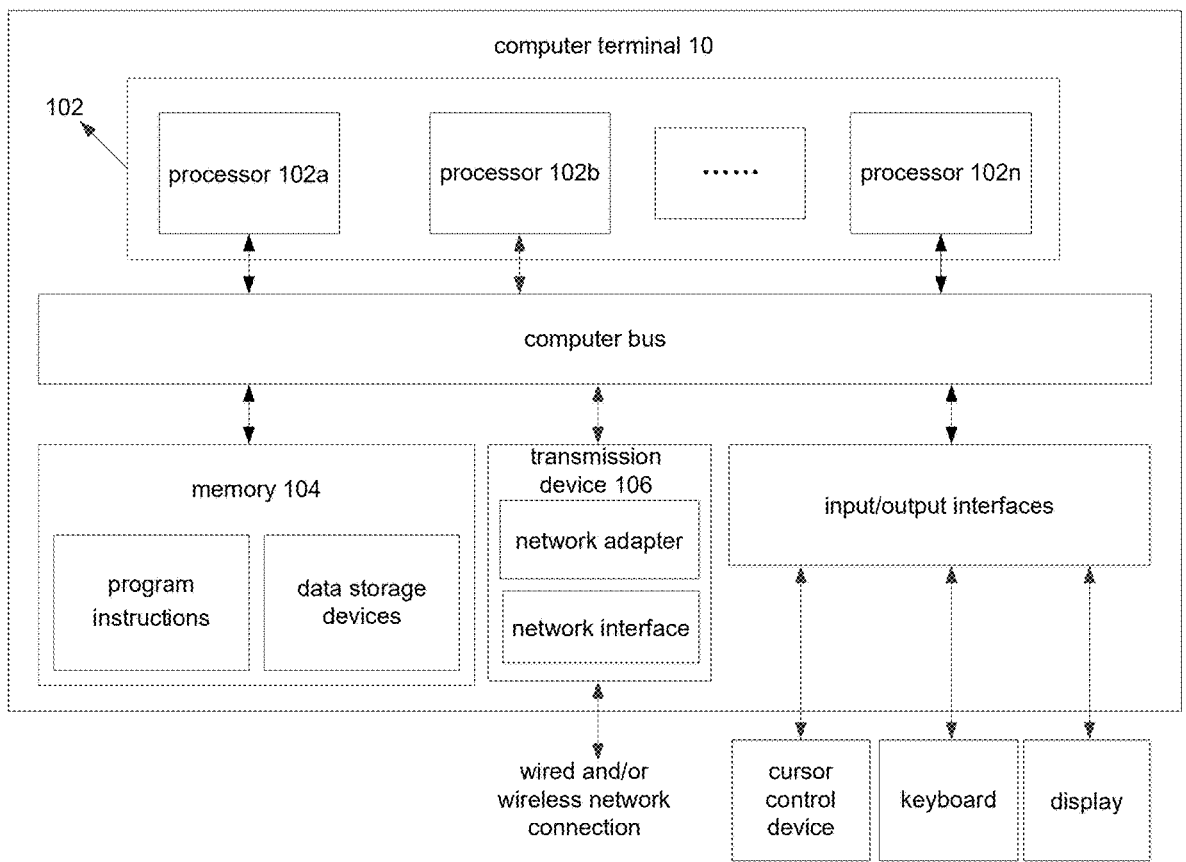
FIG. 3 is a block diagram of the hardware structure of a computer terminal (or mobile device) used to implement the image generation method according to some embodiments of the present disclosure.

The method implementation example provided in some embodiments can be executed in a mobile terminal, a computer terminal, or a similar computing device. FIG. 3 is a block diagram of the hardware structure of a computer terminal (or mobile device) used for implementing the image generation method. As shown in FIG. 3, the computer terminal 10 (or mobile device) may include at least one processor 102 (the processor 102 may include, but is not limited to, processing devices such as microprocessors or programmable logic devices), a memory 104 for storing data, and a transmission device 106 for communication functions. In addition, the computer terminal 10 may also include at least one of: a display, input/output interfaces (I/O interfaces), a Universal Serial Bus (USB) port (which can be included as one of the ports in a BUS), a network interface, a power supply, and a camera. It is understood by a person of ordinary skill in the art that the structure shown in FIG. 3 is illustrative and does not limit the structure of the above-mentioned electronic devices. For example, the computer terminal 10 may include more or fewer components than those shown in FIG. 3, or may have a configuration different from that shown in FIG. 3.

It should be noted that the at least one processor 102 and/or other data processing circuits mentioned herein are generally referred to as "data processing circuits" in this text. This data processing circuit can be fully or partially embodied as software, hardware, firmware, or any combination thereof. Moreover, the data processing circuit can be a single independent processing module or fully or partially integrated into any one of the other components within the computer terminal 10 (or mobile device). As involved in some embodiments, the data processing circuit, as a processor control (for example, the selection of a variable resistor terminal path connected to an interface).

The memory 104 can be used to store software programs and modules for application software, such as program instructions or data storage devices corresponding to the image generation method in some embodiments. The processor 102 executes various functional applications and data processing by running the software programs and modules stored in the memory 104, that is, to implement the aforementioned image generation method. The memory 104 may include high-speed random access memory and may also include non-transitory memory, such as at least one magnetic storage device, flash memory, or other non-transitory solid-state memory. In some instances, the memory 104 may further include a memory remotely set up with respect to the processor 102, which can be connected with the computer terminal 10 via a network. Examples of the above network include, but are not limited to, the Internet, an intranet, a local area network, a mobile communication network, and their combinations.

The transmission device 106 is used to receive or send data via a network. The specific example of the network mentioned above may include a wireless network provided by the communication carrier of the computer terminal 10. In some examples, the transmission device 106 includes a network adapter that can connect with other network devices via a base station to communicate with the Internet. In some examples, the transmission device 106 can be an RF module, which is used to communicate with the Internet wirelessly.

The display can be, for example, a touch screen liquid crystal display that allows users to interact with the user interface of the computer terminal 10 (or mobile device).

It should be noted that, in some optional embodiments, the computer device (or mobile device) shown in FIG. 3 above may include hardware elements (including circuits), software elements (including computer code stored on computer-readable media), or a combination of both hardware and software elements. It should be pointed out that FIG. 3 is an example of a specific instance and is intended to show the types of components that can exist in the above computer device (or mobile device).

In the above operating environment, the present disclosure provides an image generation method as shown in FIG. 4. FIG. 4 is a flowchart of an image generation method according to some embodiments of the present disclosure, as shown in FIG. 4, the method includes the following steps.

At step 41, a source image, a source prompt, a target prompt, a first weight and a second weight are obtained, where the source prompt is used for providing a source text condition corresponding to the source image, the target prompt is used for providing a target text condition to obtain a target image, the first weight is a weight of a guidance scale shared for inversion and generation in a source branch, the second weight is a weight of a guidance scale kept for generation in a target branch, the source branch is used for recovering the source image, and the target branch is used for generating the target image;

At step 42, inversion for image editing is performed to generate the target image based on the source image, the source prompt, the target prompt, the first weight and the second weight.

The aforementioned source image is the original image to be processed, which can be obtained by photographing objects or scenes in reality using an image capture device, or the source image can be obtained by downloading images from the Internet, or the source image can also be obtained through scanning, drawing, capturing, and other methods. The content displayed in the source image includes but is not limited to animals, landscapes, architecture, etc., and the present embodiment does not impose specific restrictions on the content displayed in the source image.

The aforementioned source prompt is used for providing a source text condition corresponding to the source image. The source text condition refers to the original text or information used in the image editing process, which is used for creating editing operations corresponding to the source image. The source text condition can include but is not limited to descriptions of the size, color depth, resolution, style, content, background, color, material, objects, etc., corresponding to the source image.

The aforementioned target prompt is used for providing a target text condition to obtain the target image, which is the image that the user wishes to generate or edit. For example, the target image can be an image generated after performing image editing operations such as object replacement or style change on the source image. If the source image is a landscape photo with a specific building, the target image can be edited to replace this building with a different building or a completely different object, such as a sculpture or trees. If the source image is a painting in the style of oil painting, the target image can be transformed through style transfer into a painting in the style of cartoons or other painting styles.

The aforementioned first weight is the weight of the shared guidance scale used in the source branch for inversion and generation, and the second weight is the weight of the guidance scale used in the target branch for generation. The guidance weight is a parameter used for controlling the balance between text-conditional and unconditional (class-free) generation during the reverse diffusion process. In classifier-free guidance, for each step of diffusion, the model makes two predictions: one based on the text condition and the other null-text condition, that is, without a text condition. Then, these two prediction results are combined according to the guidance weight to enhance the influence of the text condition. In practical applications, selecting the appropriate guidance weight is important for both the quality of generation and the editing capability. If the guidance weight is too high, it may lead to the loss of image details, while if the guidance weight is too low, it may not fully capture the semantic information of the text condition. In DDIM inversion, since some error is introduced at each step, the accumulated error may affect the quality of the final reconstructed image. Therefore, the choice of guidance weight needs to balance between maintaining image details and enhancing the guidance of the text condition.

Based on the aforementioned steps 41 to 42, by obtaining the source image, source prompt, target prompt, first weight, and second weight, and then performing image editing inversion based on the source image, source prompt, target prompt, first weight, and second weight to generate the target image, the purpose of efficiently editing the source image with high quality has been achieved. This has realized the technical effect of significantly enhancing the image editing effect while maintaining high editing efficiency, thereby solving the technical problem in related technologies where it is difficult to balance image editing effects and editing efficiency when performing image editing operations.

Further introduction to the image generation method in the present embodiment of the disclosure is provided below.

In some optional embodiments, the second weight is larger than the first weight, so as to balance image editing effects and editing efficiency when performing image editing operations.

To mitigate the issue from the asymmetric guidance scale, the inventors propose to keep the same guidance scale for inversion and generation in the source branch. The symmetric guidance scale helps reduce the approximation error in the latent states for the source image.

The inventors analyze the selection of the guidance scale from the perspective of minimizing the approximation error. For example, the weight of the shared guidance scale for inversion and generation in the source branch is set to 0.5, and the weight of the guidance scale used for generation in the target branch is set to 7.5.

In some optional embodiments, the operation of performing the inversion for image editing to generate the target image based on the source image, the source prompt, the target prompt, the first weight and the second weight may be implemented as follows.

Inversion with the first weight is performed on the source image to obtain an inversion result. The target image is obtained based on the inversion result, the source prompt, the target prompt, the first weight and the second weight.

The aforementioned inversion result can represent the random noise corresponding to the source image, where random noise refers to the random interference in the source image caused by various factors. Performing inversion on the source image using the first weight to obtain random noise is to better understand and comprehend the noise conditions corresponding to the source image, thereby allowing for more precise analysis and processing of the source image. By obtaining random noise through inversion, one can better understand the true state of the image, thus providing a more accurate basis for subsequent processing and analysis. Furthermore, the target image is obtained based on the inversion result, source prompt, target prompt, first weight, and second weight.

Based on the aforementioned optional embodiments, by performing inversion on the source image using the first weight to obtain the inversion result, and then obtaining the target image based on the inversion result, source prompt, target prompt, first weight, and second weight, it is possible to more accurately acquire the target image, thereby enhancing the effect and accuracy of image editing.

In some optional embodiments, the operation of performing inversion with the first weight on the source image to obtain the inversion result may be implemented as follows.

Denoising Diffusion Implicit Models (DDIM) inversion with the first weight is performed on the source image to obtain a first noise as the inversion result.

In DDIM inversion, the process does not start with noise and gradually remove the noise to generate an image, but rather begins with a given source image and gradually adds noise to obtain a noise encoding of the source image. DDIM inversion is commonly used in real image editing because DDIM inversion can generate a noise encoding that contains information from the original image. Then, the sampling process of DDIM can be used with this noise encoding as the initial value to approximately reconstruct the source image encoding. Performing DDIM inversion on the source image using the first weight can obtain the first noise.

Based on the aforementioned optional embodiment, by performing denoising diffusion implicit model inversion on the source image with the first weight to obtain the first noise, it can then be used to obtain the target image, thereby enhancing the effect and accuracy of image editing.

In some optional embodiments, the operation of obtaining the target image based on the inversion result, the source prompt, the target prompt, the first weight and the second weight may be implemented as follows.

A second noise is set based on the first noise, and a third noise is set based on the second noise, where the second noise is an initial noise for the source branch to preserve knowledge from the source image and the third noise is an initial noise for the target branch to obtain a new image.

A recovered image is obtained based on the second noise, the source prompt and the first weight in the source branch.

The target image is obtained based on the recovered image, the third noise, the target prompt and the second weight in the target branch.

Diffusion models propose to generate an image from a random sampled noise by a series of denoising steps. Concretely, given the noise $z_T$ (which is equivalent to the first noise), an image can be obtained iteratively with t from T to 1 according to where $z_0$ denotes the generated image or its corresponding latent for the decoder. $\in_\theta (z_t, t)$ is a learned model to predict the noise at the t-th iteration, where a text condition C can be included for classifier-free guidance as $\in_\theta (z_t, t, C)$ or a null-text condition as $\in_\theta (z_t, t, \emptyset)$. $\{\alpha_t\}$ is a sequence of predefined constants for denoising. The process is known as DDIM sampling, which is a deterministic sampling.

$$z_{t-1} = \sqrt{\frac{\alpha_{t-1}}{\alpha_t}} z_t + \sqrt{\alpha_{t-1}} \left( \sqrt{\frac{1}{\alpha_{t-1}} - 1} - \sqrt{\frac{1}{\alpha_t} - 1} \right) \in_\theta (z_t, t) \qquad (1)$$

Given a source image $$z_0^s$$

and its corresponding text condition $C_s$, image editing with text guidance aims to obtain a new image $$z_0^t$$

with the target text condition $C_t$. According to Eqn. 1, the target image will be obtained from a random noise $$z_T^t$$

(which is equivalent to the und noise). To preserve the knowledge from the source image, the random noise $$z_T^s$$

(which is equivalent to the second noise) that generates the source image will be applied as $$z_T^t = z_T^s$$

for image editing.

However, the initial noise $$z_0^s$$

cannot be inferred from Eqn. 1 with the image $$z_T^s.$$

To illustrate the issue, the inventors rearrange the terms in Eqn. 1 and have $$z_t = \sqrt{\frac{\alpha_t}{\alpha_{t-1}}} z_{t-1} + \sqrt{\alpha_t} \left( \sqrt{\frac{1}{\alpha_t} - 1} - \sqrt{\frac{1}{\alpha_{t-1}} - 1} \right) \in_\theta (z_t, t)$$

where the estimation of $z_t$ depends on the prediction from itself $\in_\theta (z_t, t)$. To approximate the reverse of the generation process, DDIM inversion considers replacing $z_t$ by $z_{t-1}$ for denoising and the process becomes $$z_t = \sqrt{\frac{\alpha_t}{\alpha_{t-1}}} z_{t-1} + \sqrt{\alpha_t} \left( \sqrt{\frac{1}{\alpha_t} - 1} - \sqrt{\frac{1}{\alpha_{t-1}} - 1} \right) \in_\theta (z_{t-1}, t) \qquad (2)$$

which helps obtain the initial noise $$z_T^s$$

for editing. With $$z_T^s,$$

many existing methods apply the dual branch framework for editing, where one branch is for recovering the source image with $C_s$ and the other is to encode the target information with $C_t$. By fusing the generation processes of these branches, the source image can be edited according to the target text condition.

In some optional embodiments, the operation of obtaining the recovered image based on the second noise, the source prompt and the first weight in the source branch may be implemented as follows.

A first iterative noise is obtained iteratively in iterative steps of the source branch to obtain the recovered image based on the second noise, the source prompt and the first weight.

In the iterative steps of the source branch, the first iterative noise is obtained through iteration to obtain a restored image based on the second noise, the source prompt, and the first weight. The first iterative noise can be obtained through DDIM forward iteration to obtain a restored image based on the second noise, the source prompt, and the first weight.

DDIM inversion refers to the process in the diffusion model where noise is gradually added to the data (such as an image) until the data is completely transformed into noise. This process is the inversion process of the diffusion model, which simulates the process where the data distribution is gradually replaced by Gaussian noise. In DDIM, the inversion process is typically defined as a non-Markovian process, meaning that the state transition at each step does not entirely depend on the previous step's state but can be directly transitioned from the current state. At each step, the model adds a certain amount of noise to the data until, after multiple time steps, the data is entirely noise. The DDIM inversion process is part of the generative model training, allowing the model to learn how to remove noise from the data, thereby generating high-quality data samples in the reverse process. In image generation tasks, the DDIM inversion process simulates the process where the image gradually distorts into noise. While DDIM forward starts with noise and gradually removes the noise to generate a clear image.

In some optional embodiments, the operation of obtaining the target image based on the recovered image, the third noise, the target prompt and the second weight in the target branch may be implemented as follows.

A second iterative noise is obtained iteratively in iterative steps of the target branch based on the third noise, the target prompt and the second weight.

The second iterative is edited by the first iterative in iterative steps of the target branch to obtain the target image.

In the iterative steps of the target branch, the second iterative noise is obtained through iteration based on the third noise, the target prompt, and the second weight, which can then be used to edit the second iteration with the first iteration to obtain the target image in the iterative steps of the target branch using the Prompt-to-Prompt editing process.

Prompt-to-Prompt editing process is a text-guided image editing technique that allows users to edit and manipulate images generated by a diffusion model by modifying text prompts. The core of this method lies in leveraging the diffusion model's capabilities to generate images from text descriptions and to perform reverse operations on images given text prompts (i.e., DDIM inversion).

The Prompt-to-Prompt editing process typically involves the following steps.

At inversion step, an existing real image or a previously generated image is inversely transformed into a noise encoding through the diffusion model, which is the model's internal representation.

At prompt step, the user provides a text prompt, which is a natural language description of the content they wish to see in the image.

At editing operation step, the user leverages the text prompt to express the edits or changes they desire. This can involve changing objects, attributes, scenes, or styles in the image.

At forward generation step, the modified text prompt and the diffusion model starts from the noise encoding are used for generating a new image by gradually removing noise.

The key advantage of Prompt-to-Prompt editing process is intuitiveness and flexibility. Users do not need to directly manipulate image pixels or use complex graphic editing tools; instead, the users achieve editing by simply changing the text that describes the image. This method is particularly suitable for diffusion models trained on large datasets because these models have learned rich visual and semantic information. Additionally, Prompt-to-Prompt editing process is also suitable for editing real images, which requires first inversely transforming real images into internal representations through the diffusion model before text-guided editing can be performed.

In some optional embodiments, the method further includes the following implementation.

A first expression and a second expression are obtained, where the first expression represents the source text condition contained for classifier-free guidance, and the second expression represents the null-text condition.

A value of the first weight is determined based on the first expression and the second expression.

The first expression in the aforementioned process is represented as $\in_\theta (z_t, t, C)$, where the first expression represents a source text condition for classifier-free guidance. The second expression in the aforementioned process is represented as $\in_\theta (z_t, t, \varnothing)$, where the second expression represents an empty text condition. Furthermore, the value of the first weight is determined based on the first expression and the second expression.

In some optional embodiments, the value of the first weight is from 0 to 1.

In DDIM forward pass, both the source branch and target branch share the same w for generation. While the target branch is for editing that focuses on the sample quality of following the text prompt, the source branch is to preserve the information from the source image and the low approximation error is essential.

Therefore, the inventors propose to disentangle the guidance scale between dual branches and adopt the symmetric guidance scale for the source branch.

First, to keep the edit ability, the large $\omega_t$ for the target branch remains the same for generation. Unlike DDIM inversion where $\omega_t$ is also applied for the source branch, a different $\omega_s$ can be reached instead.

Considering that the source branch is for knowledge preservation, the same $\omega_s$ can be reached in the inversion and generation for the source branch to eliminate the approximation error from the asymmetric process. The process of proposed simple inversion can be found in FIG. 2.

Finally, the inventors find that the value of $\omega_s$ can be further optimized to minimize the approximation error as follows.

$$\text{Let } x_c = h(\in_\theta (z_t, t, C) - \in_\theta (z_{t-1}, t, C)) \qquad \text{Proposition 1}$$

$$\text{and}$$

$$x_\varnothing = h(\in_\theta (z_t, t, \varnothing) - \in_\theta (z_{t-1}, t, \varnothing)),$$

then $\delta(\omega)=\|h(\in'_\theta(z_t, t, \omega))-h(\in'_\theta(z_{t-1}, t, \omega))\|_2$ is minimized when $$\omega^* = (x_\varnothing - x_c)^T x_\varnothing / \|x_c - x_\varnothing\|_2^2$$

Proof. With notations in Proposition 1, the calculation method is as follows:

$$\delta(\omega) = \|w(x_c - x_\varnothing) + x_\varnothing\|_2$$

h is a reshape operator that converts the tensor z to a vector. By minimizing $\delta(\omega)^2$ and letting the gradient to 0, the desired result can be reached.

Proposition 1 indicates that there is an optimal guidance scale that can minimize the approximation error. Moreover, its scale can be further demonstrated in the following Corollary.

Corollary 1. With notations in Proposition, if assuming the approximation error is independent between text condition and null-text condition as $$x_c^T x_\varnothing = 0,$$

the subsequent conclusions have been reached: $|\omega^*|\leq 1$.

Proof. The value of $\omega^*$ can be bounded as:

$$\|\omega^*\|_2 = \left\|(x_\varnothing - x_c)^T x_\varnothing\right\|_2 / \|x_c - x_\varnothing\|_2^2 \leq \|x_\varnothing\|_2 / \|x_c - x_\varnothing\|_2$$

With the independent assumption, the calculation method is as follows:

$$\|\omega^*\|_2 \leq \|x_\varnothing\|_2 \Big/ \sqrt{\|x_c\|_2^2 + \|x_\varnothing\|_2^2} \leq 1$$

Corollary 1 shows the possible range for the optimal $\omega_s$, but it is still challenging to obtain the result without $\in_\theta(z_t, t, C)$ and $\in_\theta(z_t, t, \varnothing)$. To set an applicable weight, the inventors investigate the upper-bound of the error.

The process of the "Simple Inversion for Image Editing (SimInversion)" algorithm can be implemented as follows. Initially, the source image $$z_0^s,$$

source prompt $C_s$, target prompt $C_t$, and weights $\omega_s$ and $\omega_t$ can be set as the input parameters. Then, $z_T$ is obtained using $\omega_s$ through DDIM inversion as defined by Equation 2. Subsequently, starting from time step T and decrementing down to 1, for each time step t, the following operations are performed. First $$z_{t-1}^s$$

is obtained through DDIM inversion using $\omega_s$ and $C_s$. Then $$z_{t-1}^t$$

is acquired using $\omega_t$ and $C_t$. Finally, $$z_{t-1}^t$$

(which is equivalent to the second iterative noise mentioned-above) by $$z_{t-1}^s$$

(which is equivalent to the first iterative noise mentioned-above) is edited with any existing image editing methods. This process continues until the time step reaches 1, ultimately returning the target image $$z_0^t.$$

Proposition 2. With notations in Proposition 1, the calculation method is as follows:

$$\delta(\omega)^2 \leq |\omega| \|x_c\|_2 + |1 - \omega| \|x_\varnothing\|_2$$

Since $\omega \geq 0$ for text condition, the upper-bound can be minimized as $$\text{Let } \delta'(\omega) = |\omega| \|x_c\|_2 + |1 - \omega| \|x_\varnothing\|_2. \qquad \text{Corollary 2}$$

When $\omega \geq 0$, the calculation method is as follows:

$$\delta'(\omega) \geq \min\{\delta'(0), \delta'(1)\}$$

Proof. It is due to that the $\delta'(\omega)$ is a monotonic function when $\omega \in [0, 1]$ and $\omega \in =[1, \infty)$.

Corollary 2 demonstrates that the upper-bound of the approximation error can be minimized when $\omega = 0$ or 1. While the optimal $\omega^*$ varies for different images, $\{0, 1\}$ guarantees the overall worst-case performance, which is consistent with the training process of DDPM sampling with classifier-free guidance.

Therefore, the inventors can empirically set $\omega_s$ to be from 0 to 1 (such as 0.5) and implement the symmetric DDIM inversion in FIG. 2. Compared with the vanilla DDIM inversion, the difference is the symmetric generation process for the source branch. Since the framework of DDIM inversion has not been changed, the proposed simple inversion (SimInversion) can be incorporated with existing editing methods to improve the performance of DDIM inversion.

In some optional embodiments, the inversion for image editing includes at least one of the followings.

(1) Image Editing for Random Editing

For example, when performing random image editing, random pixel perturbations or color changes can be applied to a landscape photo to create an abstract art effect.

(2) Image Editing for Changing Object

For example, when editing an image to change objects, one car A in a photo containing several cars can be replaced with car B to change the object in the image.

(3) Image Editing for Adding Object

For example, when editing an image to add objects, a beach photo that is empty can have a sun umbrella and lounge chair added to increase the richness of the image content.

(4) Image Editing for Deleting Object

For example, when editing an image to delete objects, some pedestrians or vehicles can be removed from a busy street photo to simplify the scene or highlight other elements.

(5) Image Editing for Changing Content

For example, when editing an image to change content, a photo of a meeting room can be modified to the interior of a library full of bookshelves to change the content of the image.

(6) Image Editing for Changing Pose

For example, when editing an image to change posture, a person's posture in a portrait can be edited from standing to sitting to fit specific compositional requirements.

(7) Image Editing for Changing Color

For example, when editing an image to change color, a color photo can be converted to black and white, or a specific color filter can be applied, such as a vintage sepia tone or a cold blue filter.

(8) Image Editing for Changing Material

For example, when editing an image to change material, the glossiness of a metal surface can be modified to the rough texture of wood, changing the visual effect of the object's surface.

(9) Image Editing for Changing Background

For example, when editing an image to change the background, the background of a portrait photo can be replaced from an urban streetscape to a tranquil landscape painting to create a different atmosphere.

(10) Image Editing for Changing Style

For example, when editing an image to change style, a regular photo can be transformed into the painting style of artist A through style transfer technology, to imitate their artistic style.

The above types of edits can be used individually or in combination to achieve specific visual effects or meet specific creative needs. During the image editing inversion process, appropriate editing operations can be selected based on the requirements of the source image and the target prompts to generate the target image. The embodiment of this application can have a wide range of applications in fields such as artistic creation, advertising design, and post-production of films.

It should be noted that the user information (including but not limited to user device information, personal user information, etc.) and data (including but not limited to data used for analysis, stored data, displayed data, etc.) involved in this disclosure are all authorized by the user or fully authorized by the parties involved. The collection, use, and processing of the relevant data must comply with the relevant laws, regulations, and standards of the countries and regions concerned, and there should be corresponding operational interfaces provided for users to choose to authorize or refuse.

It should also be noted that, for the sake of simplicity in the description, the various method embodiments mentioned above are all expressed as a series of action combinations. However, those skilled in the art should be aware that this disclosure is not limited to the order of actions described, as some steps can be performed in a different order or simultaneously according to this disclosure. Furthermore, those skilled in the art should also be aware that the embodiments described in the specification are preferred embodiments, and the actions and modules involved are not necessarily essential to this disclosure.

Through the above description of the implementation methods, those skilled in the art can clearly understand that the methods according to the above embodiments can be implemented by means of software plus the necessary general-purpose hardware platform, and of course, they can also be implemented through hardware. Based on this understanding, the technical solution of this disclosure, or the part that contributes to the existing technology, can be embodied in the form of a software product. This computer software product is stored on a storage medium (such as ROM/RAM, magnetic disk, CD, etc.) and includes several instructions to enable a terminal device (which can be a mobile phone, computer, server, or network device, etc.) to perform the methods described in the various embodiments of this disclosure.

Figure 5:
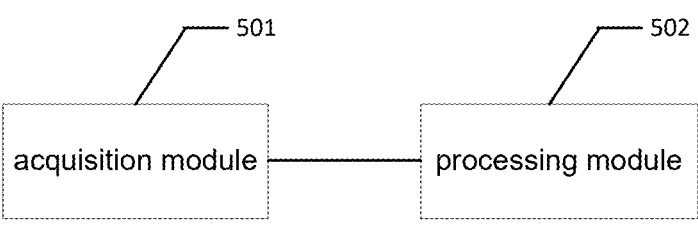
FIG. 5 is a structural block diagram of an image generation device according to some embodiments of the present disclosure.

According to some embodiments, an apparatus for implementing the aforementioned image generation method is also provided. FIG. 5 is a structural block diagram of an image generation apparatus according to some embodiments of the present disclosure. As shown in FIG. 5, the apparatus includes:

acquisition module 501, arranged for obtaining a source image, a source prompt, a target prompt, a first weight and a second weight, wherein the source prompt is used for providing a source text condition corresponding to the source image, the target prompt is used for providing a target text condition to obtain a target image, the first weight is a weight of a guidance scale shared for inversion and generation in a source branch, the second weight is a weight of a guidance scale kept for generation in a target branch, the source branch is used for recovering the source image, and the target branch is used for generating the target image;

processing module 502, arranged for performing inversion for image editing to generate the target image based on the source image, the source prompt, the target prompt, the first weight and the second weight.

Optionally, the second weight is larger than the first weight.

Optionally, the processing module 502 is further arranged for performing inversion with the first weight on the source image to obtain an inversion result; obtaining the target image based on the inversion result, the source prompt, the target prompt, the first weight and the second weight.

Optionally, the processing module 502 is further arranged for performing Denoising Diffusion Implicit Models (DDIM) inversion with the first weight on the source image to obtain a first noise as the inversion result.

Optionally, the processing module 502 is further arranged for determining a second noise based on the first noise, and determining a third noise based on the second noise, wherein the second noise is an initial noise for the source branch to preserve knowledge from the source image and the third noise is an initial noise for the target branch to obtain a new image; obtaining a recovered image based on the second noise, the source prompt and the first weight in the source branch; obtaining the target image based on the recovered image, the third noise, the target prompt and the second weight in the target branch.

Optionally, the processing module 502 is further arranged for obtaining iteratively a first iterative noise in iterative steps of the source branch to obtain the recovered image based on the second noise, the source prompt and the first weight.

Optionally, the processing module 502 is further arranged for obtaining iteratively a second iterative noise in iterative steps of the target branch based on the third noise, the target prompt and the second weight; editing the second iterative noise by the first iterative noise in iterative steps of the target branch to obtain the target image.

Optionally, the processing module 502 is further arranged for obtaining a first expression and a second expression, wherein the first expression represents the source text condition contained for classifier-free guidance, and the second expression represents the null-text condition; determining a value of the first weight based on the first expression and the second expression.

Optionally, the value of the first weight is from 0 to 1, e.g., 0.5.

Optionally, the inversion for image editing includes at least one of the followings: image editing for random editing; image editing for changing object; image editing for adding object; image editing for deleting object; image editing for changing content; image editing for changing pose; image editing for changing color; image editing for changing material; image editing for changing background; image editing for changing style.

It should be noted that the acquisition module 501 and the processing module 502 correspond to steps 41 to 42 in aforementioned embodiments. The two modules and the instances and application scenarios they achieve are the same as those corresponding to the steps, but are not limited to the content disclosed in the aforementioned embodiments. It should be noted that the above modules or units can be hardware components or software components stored in a memory (for example, memory 104) and processed by at least one processor (for example, processor 102*a*, 102*b*, . . . , 102*n*). The above modules can also be part of a device that can operate within the computer terminal 10 provided in some embodiments.

According to some embodiments, an electronic device is further provided, and the electronic device includes at least one processor, a memory communicatively connected with the at least one processor, the memory is arranged to store instructions executable by the at least one processor, the instructions, when executed by the at least one processor, enabling the at least one processor to execute the following steps: a source image, a source prompt, a target prompt, a first weight and a second weight are obtained, the source prompt is used for providing a source text condition corresponding to the source image, the target prompt is used for providing a target text condition to obtain a target image, the first weight is a weight of a guidance scale shared for inversion and generation in a source branch, the second weight is a weight of a guidance scale kept for generation in a target branch, the source branch is used for recovering the source image, and the target branch is used for generating the target image; inversion for image editing is performed to generate the target image based on the source image, the source prompt, the target prompt, the first weight and the second weight.

Figure 6:
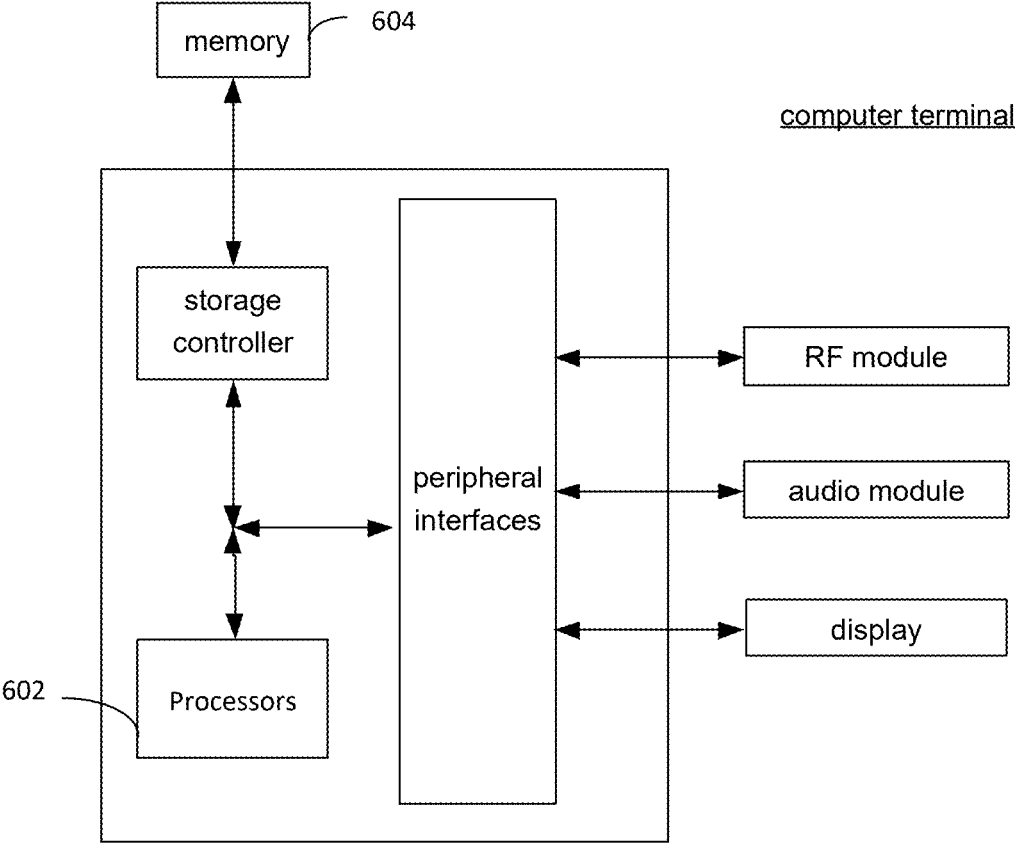
FIG. 6 is a structural block diagram of a computer terminal according to some embodiments of the present disclosure.

The electronic device mentioned above can be a computer terminal, which can be any computer terminal device within a group of computer terminals. Optionally, in some embodiments, the aforementioned computer terminal can also be replaced with terminal devices such as mobile terminals. Optionally, in some embodiments, the aforementioned computer terminal can be at least one network device among multiple network devices on a computer network. Optionally, FIG. 6 is a structural block diagram of a computer terminal according to some embodiments of the present disclosure. As shown in FIG. 6, the computer terminal may include: at least one (one is shown in the figure) processors 602, a memory 604, a storage controller, and peripheral interfaces, among which the peripheral interfaces are connected to an RF module, an audio module, and a display.

The memory can be used to store software programs and modules, such as the program instructions or modules corresponding to the image generation method and device in some embodiments, and the processor executes various functional applications and data processing by running the software programs and modules stored in the memory, thereby implementing the aforementioned image generation method. The memory may include high-speed random access memory and may also include non-transitory memory, such as at least one magnetic storage device, flash memory, or other non-transitory solid-state memory. In some instances, the memory may further include remotely located storage relative to the processor, which can be connected with the computer terminal via a network. Examples of such networks include, but are not limited to, the Internet, an intranet, a local area network, a mobile communication network, and their combinations. The processor can call upon the information and applications stored in the memory through a transmission device to perform the following steps:

The processor can call upon the information and applications stored in the memory through a transmission device to perform the following steps: obtaining a source image, a source prompt, a target prompt, a first weight and a second weight, where the source prompt is used for providing a source text condition corresponding to the source image, the target prompt is used for providing a target text condition to obtain a target image, the first weight is a weight of a guidance scale shared for inversion and generation in a source branch, the second weight is a weight of a guidance scale kept for generation in a target branch, the source branch is used for recovering the source image, and the target branch is used for generating the target image; performing inversion for image editing to generate the target image based on the source image, the source prompt, the target prompt, the first weight and the second weight.

Optionally, the second weight is larger than the first weight.

Optionally, the aforementioned processor can also execute program code for the following steps: performing inversion with the first weight on the source image to obtain an inversion result; obtaining the target image based on the inversion result, the source prompt, the target prompt, the first weight and the second weight.

Optionally, the aforementioned processor can also execute program code for the following steps: performing Denoising Diffusion Implicit Models (DDIM) inversion with the first weight on the source image to obtain a first noise as the inversion result.

Optionally, the aforementioned processor can also execute program code for the following steps: determining a second noise based on the first noise, and determining a third noise based on the second noise, where the second noise is an initial noise for the source branch to preserve knowledge from the source image and the third noise is an initial noise for the target branch to obtain a new image; obtaining a recovered image based on the second noise, the source prompt and the first weight in the source branch; obtaining the target image based on the recovered image, the third noise, the target prompt and the second weight in the target branch.

Optionally, the aforementioned processor can also execute program code for the following steps: obtaining iteratively a first iterative noise in iterative steps of the source branch to obtain the recovered image based on the second noise, the source prompt and the first weight.

Optionally, the aforementioned processor can also execute program code for the following steps: obtaining iteratively a second iterative noise in iterative steps of the target branch based on the third noise, the target prompt and the second weight; editing the second iterative noise by the first iterative noise in iterative steps of the target branch to obtain the target image.

Optionally, the aforementioned processor can also execute program code for the following steps: obtaining a first expression and a second expression, where the first expression represents the source text condition contained for classifier-free guidance, and the second expression represents a null-text condition; determining a value of the first weight based on the first expression and the second expression.

Optionally, the value of the first weight is from 0 to 1, e.g., 0.5.

Optionally, the inversion for image editing includes at least one of the followings: image editing for random editing; image editing for changing object; image editing for adding object; image editing for deleting object; image editing for changing content; image editing for changing pose; image editing for changing color; image editing for changing material; image editing for changing background; image editing for changing style.

A person of ordinary skill in the art would understand that the structure shown in FIG. 6 is illustrative, and the computer terminal can also be terminal devices such as smart phones, tablet computers, personal digital assistants (PDAs), and mobile internet devices. FIG. 6 does not limit the structure of the aforementioned electronic devices. For example, the computer terminal may include more or fewer components than those shown in FIG. 6 (such as network interfaces, display devices, etc.), or it may have a configuration different from that shown in FIG. 6.

A person of ordinary skill in the art would understand that all or part of the steps in the various methods of the above embodiment can be completed by instructing the relevant hardware of the terminal device with a program, which can be stored on a computer-readable storage medium. The storage medium may include: flash drives, read-only memory (ROM), random access memory (RAM), hard disks, or optical discs, etc.

In some embodiments of the present disclosure, a non-transitory storage medium is further provided, and the non-transitory storage medium includes: an executable program, and when the executable program runs, an electronic device on which the non-transitory storage medium is located to execute the following steps: a source image, a source prompt, a target prompt, a first weight and a second weight are obtained, the source prompt is used for providing a source text condition corresponding to the source image, the target prompt is used for providing a target text condition to obtain a target image, the first weight is a weight of a guidance scale shared for inversion and generation in a source branch, the second weight is a weight of a guidance scale kept for generation in a target branch, the source branch is used for recovering the source image, and the target branch is used for generating the target image; inversion for image editing is performed to generate the target image based on the source image, the source prompt, the target prompt, the first weight and the second weight.

Optionally, the aforementioned storage medium can be located in any computer terminal within a group of computer terminals on a computer network, or it can be located in any mobile terminal within a group of mobile terminals.

Optionally, the storage medium is configured to store program code for executing the following steps: obtaining a source image, a source prompt, a target prompt, a first weight and a second weight, wherein the source prompt is used for providing a source text condition corresponding to the source image, the target prompt is used for providing a target text condition to obtain a target image, the first weight is a weight of a guidance scale shared for inversion and generation in a source branch, the second weight is a weight of a guidance scale kept for generation in a target branch, the source branch is used for recovering the source image, and the target branch is used for generating the target image; performing inversion for image editing to generate the target image based on the source image, the source prompt, the target prompt, the first weight and the second weight.

Optionally, the second weight is larger than the first weight.

Optionally, the storage medium is configured to store program code for executing the following steps: performing inversion with the first weight on the source image to obtain an inversion result; obtaining the target image based on the inversion result, the source prompt, the target prompt, the first weight and the second weight.

Optionally, the storage medium is configured to store program code for executing the following steps: performing Denoising Diffusion Implicit Models (DDIM) inversion with the first weight on the source image to obtain a first noise as the inversion result.

Optionally, the storage medium is configured to store program code for executing the following steps: determining a second noise based on the first noise, and determining a third noise based on the second noise, where the second noise is an initial noise for the source branch to preserve knowledge from the source image and the third noise is an initial noise for the target branch to obtain a new image; obtaining a recovered image based on the second noise, the source prompt and the first weight in the source branch; obtaining the target image based on the recovered image, the third noise, the target prompt and the second weight in the target branch.

Optionally, the storage medium is configured to store program code for executing the following steps: obtaining iteratively a first iterative noise in iterative steps of the source branch to obtain the recovered image based on the second noise, the source prompt and the first weight.

Optionally, the storage medium is configured to store program code for executing the following steps: obtaining iteratively a second iterative noise in iterative steps of the target branch based on the third noise, the target prompt and the second weight; editing the second iterative noise by the first iterative noise in iterative steps of the target branch to obtain the target image.

Optionally, the storage medium is configured to store program code for executing the following steps: obtaining a first expression and a second expression, where the first expression represents the source text condition contained for classifier-free guidance, and the second expression represents the null-text condition; determining a value of the first weight based on the first expression and the second expression.

Optionally, the value of the first weight is from 0 to 1, e.g., 0.5.

Optionally, the inversion for image editing includes at least one of the followings: image editing for random editing; image editing for changing object; image editing for adding object; image editing for deleting object; image editing for changing content; image editing for changing pose; image editing for changing color; image editing for changing material; image editing for changing background; image editing for changing style.

It should be understood that the steps are reordered, added, or deleted by using the various forms of flow shown above. For example, the steps described in the present disclosure are executed in parallel, are executed sequentially, or are executed in a different order, as long as desired results of the technical solutions disclosed in the present disclosure may be achieved, which is not limited herein.

The above specific embodiments do not limit the scope of protection of the present disclosure. It will be apparent to those skilled in the art that various modifications, combinations, sub-combinations, and alterations are made depending upon design requirements and other factors. Any modifications, equivalent replacements, improvements and the like made within the spirit and principle of the present disclosure shall belong to the scope of protection of the present disclosure.

What is claimed is:

1. A method for image generation, comprising:

obtaining a source image, a source prompt, a target prompt, a first weight and a second weight, wherein the source prompt is used for providing a source text condition corresponding to the source image, the target prompt is used for providing a target text condition to obtain a target image, the first weight is a weight of a guidance scale shared for inversion and generation in a source branch, the second weight is a weight of a guidance scale kept for generation in a target branch, the source branch is used for recovering the source image, and the target branch is used for generating the target image;

performing inversion with the first weight on the source image to obtain an inversion result;

determining a second noise based on a first noise, and determining a third noise based on the second noise, wherein the second noise is an initial noise for the source branch to preserve knowledge from the source image and the third noise is an initial noise for the target branch to obtain a new image;

obtaining a recovered image based on the second noise, the source prompt and the first weight in the source branch; and obtaining the target image based on the recovered image, the third noise, the target prompt and the second weight in the target branch.

2. The method as claimed in claim 1, wherein the second weight is larger than the first weight.

3. The method as claimed in claim 1, wherein performing inversion with the first weight on the source image to obtain the inversion result comprises:

performing Denoising Diffusion Implicit Models (DDIM) inversion with the first weight on the source image to obtain a first noise as the inversion result.

4. The method as claimed in claim 1, wherein obtaining the recovered image based on the second noise, the source prompt and the first weight in the source branch comprises:

obtaining iteratively a first iterative noise in iterative steps of the source branch to obtain the recovered image based on the second noise, the source prompt and the first weight.

5. The method as claimed in claim 4, wherein obtaining the target image based on the recovered image, the third noise, the target prompt and the second weight in the target branch comprises:

obtaining iteratively a second iterative noise in iterative steps of the target branch based on the third noise, the target prompt and the second weight; and editing the second iterative noise by the first iterative noise in iterative steps of the target branch to obtain the target image.

6. The method as claimed in claim 1, wherein the method further comprises:

obtaining a first expression and a second expression, wherein the first expression represents the source text condition contained for classifier-free guidance, and the second expression represents a null-text condition; and determining a value of the first weight based on the first expression and the second expression.

7. The method as claimed in claim 6, wherein the value of the first weight is from 0 to 1.

8. The method as claimed in claim 1, wherein the inversion for image editing comprises at least one of the followings:

image editing for random editing;

image editing for changing object;

image editing for adding object;

image editing for deleting object;

image editing for changing content;

image editing for changing pose;

image editing for changing color;

image editing for changing material;

image editing for changing background; and image editing for changing style.

9. An electronic device comprising:

at least one processor;

a memory communicatively connected with the at least one processor; wherein the memory is arranged to store instructions executable by the at least one processor, the instructions, when executed by the at least one processor, enabling the at least one processor to execute the following steps:

obtaining a source image, a source prompt, a target prompt, a first weight and a second weight, wherein the source prompt is used for providing a source text condition corresponding to the source image, the target prompt is used for providing a target text condition to obtain a target image, the first weight is a weight of a guidance scale shared for inversion and generation in a source branch, the second weight is a weight of a guidance scale kept for generation in a target branch, the source branch is used for recovering the source image, and the target branch is used for generating the target image;

performing inversion with the first weight on the source image to obtain an inversion result;

determining a second noise based on a first noise, and determining a third noise based on the second noise, wherein the second noise is an initial noise for the source branch to preserve knowledge from the source image and the third noise is an initial noise for the target branch to obtain a new image;

obtaining a recovered image based on the second noise, the source prompt and the first weight in the source branch; and obtaining the target image based on the recovered image, the third noise, the target prompt and the second weight in the target branch.

10. The electronic device as claimed in claim 9, wherein the second weight is larger than the first weight.

11. The electronic device as claimed in claim 9, wherein performing inversion with the first weight on the source image to obtain the inversion result comprises:

performing Denoising Diffusion Implicit Models (DDIM) inversion with the first weight on the source image to obtain a first noise as the inversion result.

12. A non-transitory storage medium, wherein the non-transitory storage medium comprises: an executable program, and when the executable program runs, an electronic device on which the non-transitory storage medium is located to execute the following steps:

the memory is arranged to store instructions executable by the at least one processor, the instructions, when executed by the at least one processor, enabling the at least one processor to execute the following steps:

obtaining a source image, a source prompt, a target prompt, a first weight and a second weight, wherein the source prompt is used for providing a source text condition corresponding to the source image, the target prompt is used for providing a target text condition to obtain a target image, the first weight is a weight of a guidance scale shared for inversion and generation in a source branch, the second weight is a weight of a guidance scale kept for generation in a target branch, the source branch is used for recovering the source image, and the target branch is used for generating the target image;

performing inversion with the first weight on the source image to obtain an inversion result;

determining a second noise based on a first noise, and determining a third noise based on the second noise, wherein the second noise is an initial noise for the source branch to preserve knowledge from the source image and the third noise is an initial noise for the target branch to obtain a new image;

obtaining a recovered image based on the second noise, the source prompt and the first weight in the source branch; and obtaining the target image based on the recovered image, the third noise, the target prompt and the second weight in the target branch.

13. The non-transitory storage medium as claimed in claim 12, wherein the second weight is larger than the first weight.

14. The non-transitory storage medium as claimed in claim 12, wherein performing inversion with the first weight on the source image to obtain the inversion result comprises:

performing Denoising Diffusion Implicit Models (DDIM) inversion with the first weight on the source image to obtain a first noise as the inversion result.

* * * * *